Dec. 8, 1964  C. E. JOHANSON  3,160,006
SENSORS

Filed March 24, 1961  2 Sheets-Sheet 1

INVENTOR.
CARL E. JOHANSON
BY
*Grover G. Luster*
ATTORNEY

Dec. 8, 1964   C. E. JOHANSON   3,160,006
SENSORS

Filed March 24, 1961   2 Sheets-Sheet 2

INVENTOR.
CARL E. JOHANSON
BY
ATTORNEY

United States Patent Office 3,160,006
Patented Dec. 8, 1964

3,160,006
SENSORS
Carl E. Johanson, Davenport, Iowa, assignor to The Bendix Corporation, Davenport, Iowa, a corporation of Delaware
Filed Mar. 24, 1961, Ser. No. 98,117
5 Claims. (Cl. 73—182)

This invention relates to improvements in transducers for condition sensors and it relates particularly to improvements in pressure-to-mechanical movement transducers for flight condition sensors.

An object of the invention is to provide improved pressure-to-mechanical motion transducers. Various flight conditions including altitude, Mach number, the several airspeed functions, and others, vary as a function of altitude pressure and dynamic pressure. It is seldom possible to manufacture a pressure sensitive diaphragm or capsule whose output movement is related to one of these flight conditions in exactly the way that the flight condition is related to pressure. Instead the output movement of the primary transducer must be modified and another object of this invention is to provide a novel and improved means by which to accomplish such modification.

Other objects and advantages of the invention including the provision of improved transducers for representing altitude and other flight conditions will be apparent from the specification and drawing.

In the latter:

FIG. 6 shows the portion of the mechanism seen from line 6—6 of FIG. 7.

In representing flight conditions, some physical condition which varies as a function of the flight condition is converted into mechanical motion by a primary transducer. Because most flight conditions can be represented as altitude pressure or dynamic pressure or a combination of these pressures, the primary transducer conveniently comprises a pressure sensitive expansible capsule. It is usually not practical or possible to produce a capsule whose expansion and contraction varies as the desired function of the flight condition. Instead a motion modifying mechanism is interposed between the capsule and a readout element. It is the function of the motion modifying mechanism to translate capsule motion into a readout element motion that has the desired relation to the flight condition to be represented.

The combination of capsule and motion modifying mechanism must solve the mathematical expression that relates the flight condition and the physical condition sensed. This invention relates to a novel construction capable of performing this function. In addition, the invention provides a novel means for overcoming errors resulting from differences in actual and measured values of the physical condition which represents the flight condition being sensed.

The invention is applicable to measuring and sensing various flight conditions such as rate of climb, Mach number, the various air speeds, and other. It is especially applicable to measuring and sensing altitude and accordingly the embodiments of the invention selected for illustration will be described primarily in relation to altitude sensing and measurement.

Figure 1:
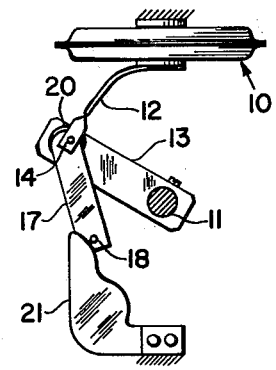
FIG. 1 is a diagram of a pressure-to-motion transducer embodying the invention.
Figure 3:
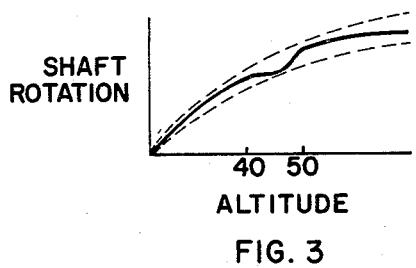
FIG. 3 is a graph of altitude transducer output displacement plotted against shaft rotation.

FIG. 1 illustrates the altitude transducer of an altimeter. Aneroid capsule 10 is subjected to altitude pressure and it expands and contracts with changes in pressure. This motion of the aneroid is translated into rotation of a readout element, here shaft 11. One common specification for altimeters is represented in FIG. 3 where the two dashed lines define the limits of permissible degree of shaft 11 rotation at each altitude from sea level to a high altitude. The problem is to provide a mechanism in which shaft rotation will remain within these limits as pressure altitude is changed.

Pressure altitude $Hp$ is related to altitude pressue $Ps$ as follows:

$$Hp = 221 \; T \; \text{Log} \; K/Ps$$

where K is a constant and T is absolute temperature at the altitude being measured. T is very difficult to measure. In ordinary altimetry it is not measured but is conventionally assumed to decrease linearly from sea level to 35,000 feet and to remain constant from 35,000 feet to 105,000 feet. These assumptions result in errors in indicated altitude (rotational position of shaft 11) at 40,000 and 50,000 feet in conventional instruments employing standard construction. Such standard instruments have a readout shaft variation with altitude which is represented by the solid curve in FIG. 3. How these errors can be overcome by the invention with very inexpensive structures, and without need to measure absolute temperature, is illustrated in FIG. 1.

The aneroid capsule 10 is fixedly mounted relative to the axis of shaft 11. Displacements of the capsule incident to change in altitude pressure are translated into rotation of shaft 11 by means of a flexible link 12 and a rocker arm 13. One end of link 12 is fastened to the movable side of capsule 10. A pin 14 is fixed, as by soldering, to the opposite end of the link. The pin extends laterally into an opening in an eccentric element 15 to provide a rotational connection between the eccentric 15 and link 12.

Figure 2:
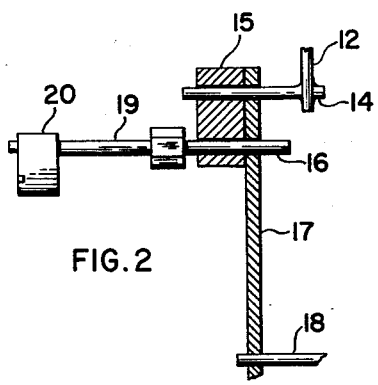
FIG. 2 is a sectional view in elevation of an element in the embodiment of FIG. 1.

The eccentric 15 is best seen in FIG. 2. It comprises a generally cylindrical body provided with two openings which are spaced apart and are parallel, pin 14 extends through one of these openings and a second pin 16 extends through the other. The eccentric further comprises an arm 17 which extends laterally from the main body of the eccentric and carries a pin 18 near its extreme end. The pin 18 is fixed to the arm as by soldering and it extends in a direction parallel to pins 16 and 14. The pin 16 extends from the end of, and is joined to, a bimetallic temperature compensating element comprising a bimetal 19 whose opposite end is press-fitted into an eccentric element 20. The latter is carried by the arm 13.

Returning to FIG. 1, pin 18 acts as a cam follower in cooperation with a cam 21 whose position is fixed relative to the axis of shaft 11. Thus a means has been provided by which to modify the ratio in which displacement of the capsule 10 is translated into rotation of shaft 11. As the capsule expands, flexible link 12 will carry pin 14 downwardly whereby the eccentric 15 and its arms 17 will be driven downwardly. As an incident to this action, pin 18 is moved over the surface of cam 21 and the eccentric element is rotated about pin 16 relative to arm 13. As the eccentric is rotated the distance between pin 14 and the axis of shaft 11, and the distance between pin 16 and aneroid 10, are altered whereby an incremental displacement of the capsule will result in a different incremental rotation of arm 13 and shaft 11.

The face of the cam 21 is formed to eliminate the error at 40,000 and 50,000 feet whereby the relation of shaft rotation to altitude becomes a smooth curve if drawn in FIG. 3. The advantage is obvious. Not only is the instrument more accurate but it may be manufactured with less difficulty. The solid curve in FIG. 3 closely approaches both of the dashed limit lines. An instrument whose output curve does not exhibit the dip at 50,000 feet is more easily calibrated into the limits or, conversely, may incorporate a less precisely manufactured capsule. The dimensions of the cam profile are not very critical because the distance between pin 14 and pin 16 may be made such less than the distance separating pins 16 and 18 and because the correction required is a relatively small percentage of the total range of displacement of aneroid 10. In one practical embodiment of the invention the cam comprises a stamping without subsequent treatment except tumbling. The cost of providing the cam is more than offset by the relaxation in accuracy requirements applicable to other elements.

In FIG. 1 the cam is fixed relative to the mounting of the capsule whereby displacement of the capsule alone determines camming action. In certain applications of the invention a component of camming action independent of capsule displacement is advantageously incorporated.

Figure 4:
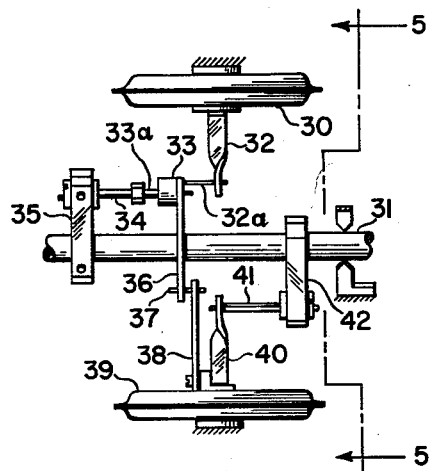
FIG. 4 is a diagram showing a modified form of the transducer of FIG. 1.
Figure 5:
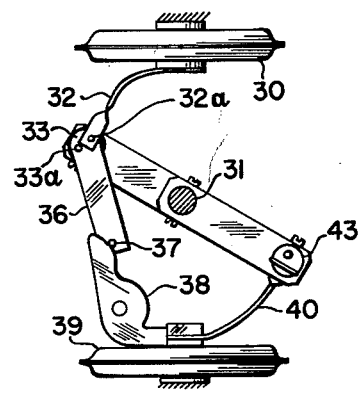
FIG. 5 is a view taken on line 5—5 of FIG. 4.

In the embodiment of FIGS. 4 and 5 the cam surface is twice as long as it would be in the case of a fixed cam such as that of FIG. 1. Thus this cam is even easier to manufacture with satisfactory accuracy. This unit comprises an aneroid 30 fixedly mounted relative to the rotatable readout shaft 31. A flexible link 32 is fixed at one end to the displaced side of the aneroid and carries a pin 32a at its opposite end which is inserted into, and has rotatable connection with, an eccentric element 33. A second pin 33a is inserted into another opening in the eccentric so that it is rotatable relative to the eccentric about an axis spaced from but parallel to the rotational axis of pin 32a. The pin 33a extends from the end of a bimetallic element 34 whose opposite end is press-fitted into an eccentric adjustment element carried at an end of a rocker arm 35. At its other end this arm 35 is connected to shaft 31. The eccentric 33 is formed with a laterally extending arm 36 which carries a cam follower pin 37. The follower pin is arranged to move over the camming surface of a cam 38.

Thus far described the unit of FIGS. 4 and 5 is like the unit of FIG. 1. However, the unit of FIGS. 4 and 5 includes a second aneroid 39. It too is fixedly mounted relative to the axis of shaft 31. Fixed to its active or displaceable side are the cam 38 and one end of a second flexible link 40. The opposite end of the link 40 is provided with an opening by which it has rotatable connection to the end pin of a second bimetallic temperature compensation element 41. The other end of this element is press-fitted into an eccentric 43 carried in one end of a second rocker arm 42. The arm is connected at its opposite end of the shaft 31.

During the assembly of these elements the capsules 30 and 39 are moved apart or, as here shown, are moved toward one another so that they are pre-stressed. They are pre-stressed in opposite directions relative to shaft 31 whereby pre-stressing has no effect on rotation of shaft 31 if the capsules are identical. If they are not identical shaft 31 will be displaced an amount which represents the average difference between them. This is common instrument practice and any initial rotation of shaft 31 is overcome in the zero set calibration procedure. However, the pre-stressing procedure assumes special significance in this construction and this is best illustrated in FIG. 5. Remembering that the capsules 30 and 39 have been forced toward one another and fixed in that position, it will be apparent that the magnitude of this stress will vary as pin 37 moves over the surface of cam 38 because in this action the eccentric 33 is rotated to change the length of the connection from aneroid 30 to shaft 31. Any change in this length will tend to rotate shaft 31. The latter is connected to capsule 39 and net effect will be to divide the change in stress between the two capsules. Thus the instrument designer has been provided a means for controlling rotation of shaft 31 not only by changing lever arm length but also by varying the degree in which the capsules are biased against displacement incident to pressure changes.

The structure of FIG. 1 is capable of solving flight condition equations, and is especially suited to solving the equation of altitude as a function of pressure. Moreover, it is capable of correcting errors introduced by using simplified and approximate forms of flight equations. FIGS. 4 and 5 illustrate refinements of the basic structure of FIG. 1 which, in certain cases, offer the advantages of greater design and manufacturing freedom and enable the production of more accurate and reliable instruments.

There is another major problem in producing flight condition transducers which are sensitive to altitude pressure. The ordinary and commonly employed means for applying altitude pressure to the transducer during flight introduces pressure errors. More specifically, it is not possible to locate a static pressure pickup on an air vehicle so that it will transmit altitude pressure accurately at all speeds of the craft. The indicated pressure is always erroneous as some function of speed, usually Mach number. Fortunately, the error function can be predetermined and, while it varies greatly in different types of aircraft, it is substantially the same for all aircraft of a given type. The invention may also be employed to correct these errors.

Airspeed and Mach number are functions of dynamic pressure. Thus errors which are a function of these variables may be corrected by altering the camming action of units such as those shown in FIGS. 1, 4, and 5 with a motion that varies with dynamic pressure. This could be accomplished, for example, by mounting the cam of FIG. 1 on a dynamic pressure capsule and altering the cam shape to modify the position of shaft 11 corresponding to any indicated altitude in an amount representing the error at that altitude in view of the speed of the craft represented by the displacement of the dynamic pressure capsule. Conversely, a corrected value of airspeed or Mach number could be obtained by interchanging the dynamic pressure capsule and aneroid.

Figure 6:
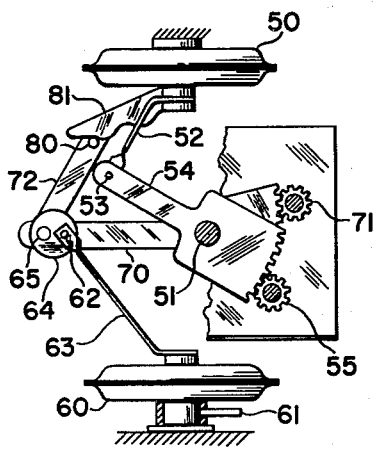
FIGS. 6 and 7 are views in side and front elevation respectively of a transducer for representing combined altitude and dynamic pressure functions and which embodies the invention.
Figure 7:
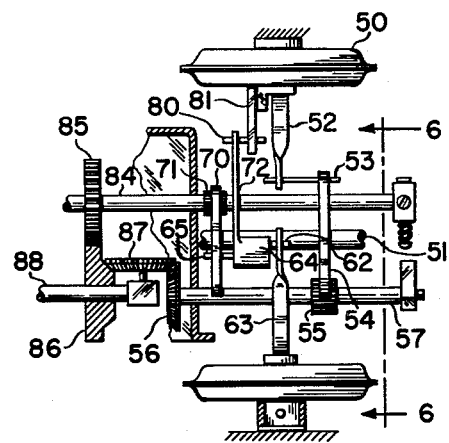

These variations are represented in the structure illustrated in FIGS. 6 and 7. The unit illustrated has readout shafts whose rotational positions are indicative of altitude, Mach number, and equivalent airspeed.

This unit comprises an aneroid capsule 50 which is subjected to altitude pressure and which is fixedly mounted relative to the axis of shaft 51. The flexible link 52 is fixed to the movable side of the capsule at one of its ends and has rotatable connection at its other end through pin 53 to a sector gear 54 which is rotatable about shaft 51 to rotate a follower gear 55 as a function of altitude pressure. Gear 55 and a beveled gear 56 are both fixed to a shaft 57 whereby gear 56 rotates as a function of altitude pressure.

The interior of the other capsule 60 is subjected to dynamic pressure transmitted to the capsule by pressure line 61. Its exterior is subjected to altitude pressure whereby the capsule expands and contracts as a function of differential pressure. Displacement of the capsule is transmitted to a pin 62 by a flexible link 63 secured at one end to capsule 60. The pin 62 is disposed in the perforation in the other end of the link 63. The pin is carried by an eccentric element 64 which is provided with a second pin 65 extending from its opposite side in a direction parallel to but spaced from pin 62. Pin 65 is inserted in an opening in one end of a sector gear 70 which is rotatable about the shaft 51 to drive a follower spur gear 71.

Means are provided for altering the length of the linkage by rotation of the eccentric element to change the degree of rotation of gear 71 for an incremental displacement of the capsule 60. This means comprises an arm 72 formed as part of the eccentric 64 and extending laterally therefrom in a direction perpendicular to the axes of pins 62 and 65. Rotation of this lever effects rotation of the eccentric and of the pins 65 and 62 relative to both the flexible link 63 and the arm of the sector gear 70 to alter the separation between pin 65 and the capsule 60. The lever 72 is rotated by cam action between follower pin 80 and a cam 81 upon a change in displacement of either of the capsules 50 and 60. Cam 81 is secured to the movable side of capsule 60. Follower pin 80 is fixed to arm 72 so that it extends in a direction parallel to shaft 51 and pins 62 and 65.

The gear 71 is fixed to a shaft 84 to which a second gear 85 is also secured. Gear 85 cooperates with and drives a combined spur and beveled gear 86. This gear is the hollow gear of a conventional "hollow shaft" differential comprising the beveled portion of gear 86, beveled gear 56, an interconnecting beveled gear 87, and an output shaft 88. Shaft 88 rotates in proportion to the algebraic sum of the rotation of gears 56 and 86.

In operation of the unit illustrated in FIGS. 5 and 6, gear 55 is rotated as a function of altitude pressure as capsule 50 expands and contracts. Gear 71 is rotated primarily as a function of differential pressure as the movable side of capsule 60 is displaced as an incident to changes in differential pressure. However, the motion of gear 71 is modified according to a selected function, as a result of camming action between pin 80 and cam 81 to rotate eccentric 64, as an incident to displacement of the movable side of capsule 50 with changes in altitude pressure. Motions of the gears 55 and 71 are combined in the differential gearing mechanism to produce an output which is a function of altitude, Mach number, and equivalent airspeed. In this particular instrument, each of shafts 57 and 84 carries one of a cooperating pair of electrical contacts which are engaged to provide a warning signal at all Mach numbers greater than a selected Mach number at altitudes above a selected altitude. In addition the contacts are engaged at all equivalent airspeeds greater than a given speed below the selected altitude. These switch contacts are represented in FIG. 7 by contact 90 on shaft 57 and contact assembly 91 on shaft 84.

The drive links 12 in FIG. 1, 32 and 40 in FIGS. 4 and 5, and 52 and 53 in FIGS. 6 and 7, are formed of resilient material. In each case the link is flexed in operation and because all the links have the same mode of operation it will suffice to describe the operation and construction of all of them by describing link 12 in FIG. 1. The link is fixedly connected at one of its ends to either the driver or driven element and it is resilient at some point along its length intermediate the points of connection with the drive and driven element whereby it can flex in the plane of motion of these elements. Advantageously the link is formed of a strip of metal, as shown, and is fixed at one end by any convenient means, such as by soldering as shown, to the driver, here the capsule 10. The link extends from this connection and is provided at its other end with means for completing a pivotal connection with the driven element which in this case is the arm 13. In the absence of this connection the end of the link which carries pin 14 would move in a line parallel to the line along which the aneroid is displaced. However, because it is pinned to arm 13 and because the latter is limited to rotational movement, the pin 14 and the end of the link must move in an arc. In this action the link is flexed in varying degree and this flexure is opposed by the renitency of the link.

The opposing force is reflected back through the mechanism to oppose capsule expansion and to maintain pin follower 18 in engagement with cam 21. The use of the flexible link is an advantage by itself because it reduces hysteresis loss and adds a new dimension to the means by which design engineers may convert from pressure variation to rotational motion according to a desired functional relation. It will be obvious that a wide variety of opposing force variations may be provided by changing resilience of the link, length of the arm, and location of the shaft.

Associated with the means shown here as an eccentric and cam, the resilient link has special added significance. Rotation of arm 17 by camming action between follower 18 and cam 21 changes not only the spacing between pin 14 and shaft 11; it also changes the flexure of link 12 and thus the opposing force applied to capsule 10. Accordingly, the changes in direction in the cam surface of the cam 21 need be less abrupt to effect a given change in the ratio in which capsule expansion is converted to shaft rotation. Having less abrupt surface changes, the cam introduces less friction into the mechanism.

I claim:
1. In combination, a rotatable shaft, a pair of drive arms fixed to said shaft and extending laterally therefrom in opposite directions, a pair of elements each displaceable from a reference fixed relative to the axis of said shaft in response to pressure variations, a pair of drive links each connected intermediate an associated one of said elements and arms, a rotatable member interposed to complete the connection between one arm and link and being rotatable to alter the effective distance between the axis of said shaft and the point of connection between said one arm and link, and means for opposing shaft rotating displacement of said elements as a function of their combined degree of displacement including a cam and associated follower, one being fixed to said rotatable member and the other being fixed to the element associated with the other arm and link.

2. Variable rate motion transmitting apparatus for pressure-to-mechanical movement transducers, comprising a pressure responsive element experiencing displacement in response to pressure variation, a movable readout element, an eccentric element rotatable about each of two spaced axes, first driving connection means for completing a rotatable connection to said eccentric element from said pressure responsive element on one of said axes, second driving connection means completing a rotatable connection on the other of said axes to said eccentric element from said readout element, a cam and associated follower, means fixed to said eccentric element and one of the cam and follower and effective to rotate said eccentric element as the follower is moved relative to the cam for rotating said eccentric element as an incident to displacement of the pressure responsive means whereby to alter the spacing between said axes in the direction of the displacement of the pressure responsive means.

3. The invention defined in claim 2 and further comprising a second pressure responsive means experiencing displacement in response to pressure variation, and means for moving the other of said cam and follower in camming action as an incident to displacement of said second pressure responsive means.

4. Variable rate motion transmitting apparatus for pressure-to-mechanical movement transducers, comprising a pressure responsive element experiencing displacement in response to pressure variation, a rotatable member to be rotated as a function of pressure change, an eccentric member having first and second axes spaced from one another and the axis of rotation of said rotatable member pivotally connected to said movable member on the first axis, a resilient link interconnecting said pressure responsive element and the second axis of the eccentrict element, said resilient link being fixedly connected to one of said elements and pivotally connected to the other and being flexed in a degree variable with the rotational position of the eccentric element and means for rotating said eccentric element as a function of displacement of said pressure responsive element whereby to alter the flexure of said link and the spacing of said first axis and the axis of rotation of said rotatable member.

5. The invention defined in claim 4 including means for rotating said eccentric member additionally as a function of a variable condition.

References Cited in the file of this patent
UNITED STATES PATENTS

| | | |
|---|---|---|
| 2,538,824 | Anderson | Jan. 23, 1951 |

FOREIGN PATENTS

| | | |
|---|---|---|
| 737,321 | Great Britain | Sept. 21, 1955 |
| 774,327 | Great Britain | May 8, 1957 |
| 209,831 | Australia | Aug. 16, 1957 |